US011353346B2

(12) United States Patent
Bouscaren

(10) Patent No.: US 11,353,346 B2
(45) Date of Patent: Jun. 7, 2022

(54) METHOD FOR AUTOMATIC CALIBRATION OF A CAMSHAFT SENSOR IN ORDER TO CORRECT A RELUCTOR RUNOUT

(71) Applicants: Continental Automotive France, Toulouse (FR); Continental Automotive GmbH, Hannover (DE)

(72) Inventor: Denis Bouscaren, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 17/043,245

(22) PCT Filed: Mar. 28, 2019

(86) PCT No.: PCT/FR2019/050725
§ 371 (c)(1),
(2) Date: Sep. 29, 2020

(87) PCT Pub. No.: WO2019/193271
PCT Pub. Date: Oct. 10, 2019

(65) Prior Publication Data
US 2021/0025737 A1    Jan. 28, 2021

(30) Foreign Application Priority Data

Apr. 5, 2018  (FR) ...................................... 1852946

(51) Int. Cl.
*G01D 5/244*    (2006.01)
*G01D 18/00*    (2006.01)

(52) U.S. Cl.
CPC ....... *G01D 18/001* (2021.05); *G01D 5/24476* (2013.01); *G01D 18/004* (2013.01)

(58) Field of Classification Search
CPC .. G01D 5/2451; G01D 5/24452; G01D 18/00; G01D 5/3473; G01D 5/34; G01P 3/487; G01P 3/486
See application file for complete search history.

(56) References Cited

U.S. PATENT DOCUMENTS 6,100,682 A    8/2000  Schroeder
9,933,448 B1 *  4/2018  Binder ................... G01D 5/147
(Continued)

FOREIGN PATENT DOCUMENTS

CN      104285129 A    1/2015
WO      2013017211 A1  2/2013
(Continued)

OTHER PUBLICATIONS

International Search Report and Written Opinion for International Application No. PCT/FR2019/050725, dated Jun. 24, 2019, 8 pages, with partial English translation.
(Continued)

*Primary Examiner* — Alvaro E Fortich
*Assistant Examiner* — Zannatul Ferdous
(74) *Attorney, Agent, or Firm* — RatnerPrestia

(57) ABSTRACT

A method for automatic calibration of a camshaft sensor for a motor vehicle engine. The sensor includes a processing module configured to generate, from a raw signal indicative of the variations in a magnetic field which are caused by a rotation of a target and measured by a primary cell, an output signal indicative of the moments at which teeth of the target pass past the primary cell. The sensor further includes two secondary measurement cells. The calibration method therefore makes it possible to determine two different switching thresholds for each tooth from a differential signal indicative of a difference in magnetic field measurement by the secondary cells. Also disclosed are a camshaft sensor imple-
(Continued)

menting such a method, and a motor vehicle including such a sensor.

10 Claims, 5 Drawing Sheets

(56) References Cited

U.S. PATENT DOCUMENTS

| | | |
|---|---|---|
| 2005/0283300 A1 | 12/2005 | Teulings et al. |
| 2012/0249126 A1 | 10/2012 | Friedrich et al. |
| 2013/0293221 A1 | 11/2013 | Mialtu et al. |
| 2013/0320970 A1 | 12/2013 | Foletto et al. |
| 2014/0195186 A1 | 7/2014 | Carbonne et al. |
| 2016/0123770 A1 | 5/2016 | Feucht et al. |
| 2018/0017412 A1* | 1/2018 | Eagen .................... G01D 5/165 |
| 2018/0259385 A1 | 9/2018 | Mirassou et al. |
| 2018/0335441 A1* | 11/2018 | Hammerschmidt .... G01P 3/488 |
| 2018/0356256 A1* | 12/2018 | Mirassou ............. G01D 18/002 |

FOREIGN PATENT DOCUMENTS

| | | |
|---|---|---|
| WO | 2017045747 A1 | 3/2017 |
| WO | 2017088968 A1 | 6/2017 |

OTHER PUBLICATIONS

International Search Report and Written Opinion for International Application No. PCT/ER2019/050725, dated Jun. 24, 2019,12 pages.
Chinese Search Report for Chinese Application No. 2019800374231, dated Dec. 1, 2021, 2 pages.

\* cited by examiner

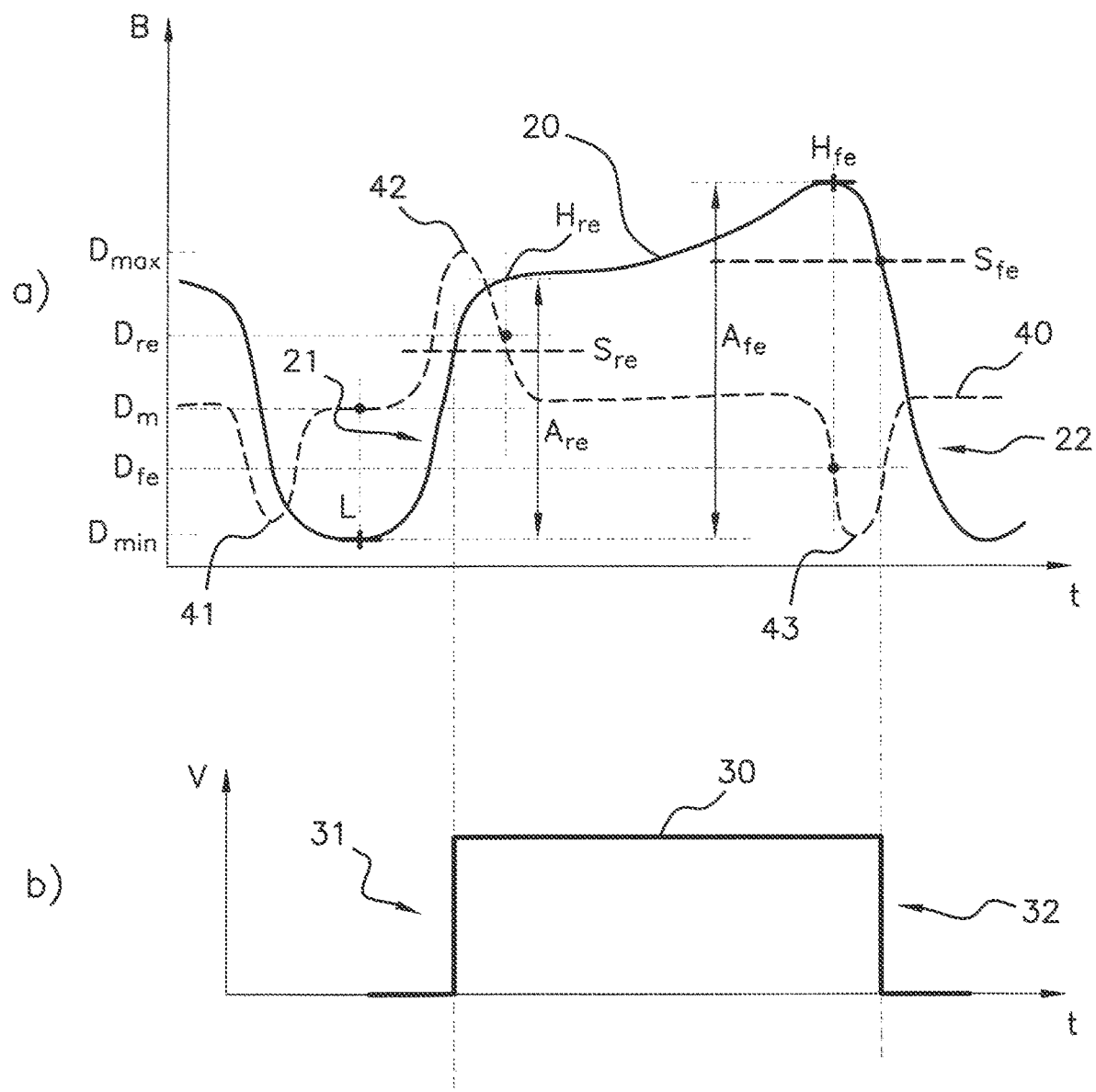

METHOD FOR AUTOMATIC CALIBRATION OF A CAMSHAFT SENSOR IN ORDER TO CORRECT A RELUCTOR RUNOUT

This application is the U.S. National Phase Application of PCT International Application No. PCT/FR2019/050725, filed Mar. 28, 2019, which claims priority to French Patent Application No. 1852946, filed Apr. 5, 2018, the contents of such applications being incorporated by reference herein.

FIELD OF THE INVENTION

The present invention relates to the field of sensors for motor vehicles. In particular, the invention relates to a method for automatically calibrating a motor vehicle camshaft sensor.

BACKGROUND OF THE INVENTION

A camshaft sensor is, for example, used in a motor vehicle to determine which stroke of the combustion cycle is taking place in a cylinder of the engine (admission stroke, compression stroke, combustion stroke, or exhaust stroke). Such information for example allows the computer to determine at what moment and into what cylinder fuel is to be injected.

Such a camshaft sensor generally comprises a target (for example a metal disk, the periphery of which is toothed), a magnetic-field generator (for example a permanent magnet), a magnetic-field measurement cell (for example a Hall-effect cell or a magneto-resistive cell) and an electronic signal-processing module.

The teeth of the target are generally all of the same height, but may have spacings (gaps) and lengths that are not all identical so as to code the angular position of the target.

Thus, the rotation of the target and the passing of the various teeth past the magnetic-field generator will generate variations in the magnetic field measured by the measurement cell, which variations can be analyzed in order to recognize the various teeth of the target and to decode the angular position of the target and, ultimately, the angular position of the camshaft rigidly connected to the target.

The measurement cell supplies the processing module with a raw signal indicative of the intensity of the magnetic field measured. The processing module then generates, from this raw signal, an output signal indicative of the moment at which the various teeth of the target pass past the measurement cell.

This output signal is, for example, an electrical signal comprising a succession of square waveforms, each square form corresponding to the passing of a tooth past the measurement cell. Each square form comprises a rising front and a falling front corresponding more or less to the passing of the mechanical fronts of the tooth past the measurement cell.

In general, each rising and falling front of the output signal (namely each transition of the electrical signal) is determined from a switching threshold that is predefined for the raw signal. In other words, the output signal exhibits a rising front when the raw signal passes above the switching threshold, and the output signal exhibits a falling front when the raw signal passes below the switching threshold. Conventionally, a switching threshold corresponding to approximately 75% of the amplitude of the raw signal is used (what is meant by the "amplitude of the raw signal" is the difference between a maximum value and a minimum value observed for said raw signal).

It is possible, for example, to define a fixed switching threshold which does not change value during operation of the sensor. However, such a solution is particularly imprecise insofar as the minimum and maximum values of the raw signal may change significantly during the operation of the sensor, notably as a function of the temperature.

It is therefore known practice in the prior art to update the value of the switching threshold for each new revolution of the target, as a function of the minimum and maximum values of the raw signal which are observed during said revolution of the target. The updated value of the switching threshold is then used for the next revolution of the target. Such a solution improves the precision of the sensor.

However, the precision of the sensor is generally also impacted by deficiencies in the geometry of the target (for example if not all of the teeth have exactly the same height). The consequence of such deficiencies is that the magnitude of the gap between the measurement cell and a tooth of the target is not the same for each tooth. The raw signal then adopts different maximum and minimum values for each tooth, and a switching threshold that is defined as optimal for one of the teeth may prove to be entirely inappropriate for another tooth.

It is therefore known practice in the prior art to determine a different switching threshold for each tooth of the target. Each switching threshold for each tooth of the target may be updated for each new revolution of the target in order to be used for the next revolution of the target. Such a solution improves the precision of the sensor still further.

Nevertheless, the various solutions of the prior art are not always able to achieve the precision required by certain motor manufacturers for a camshaft sensor.

SUMMARY OF THE INVENTION

It is an aim of the present invention to overcome all or some of the disadvantages of the prior art, notably those set out hereinabove, by proposing a method for the automatic calibration of the camshaft sensor using two different switching thresholds for each tooth of the target rather than a single switching threshold per tooth.

To this end, and according to a first aspect, the present invention proposes a method for the automatic calibration of the camshaft sensor for a motor vehicle engine. The sensor comprises:
  a toothed target,
  a primary measurement cell configured to supply a raw signal indicative of the variations in a magnetic field which are induced by a rotation of the target, and
  a processing module configured to supply, from this raw signal, an output signal indicative of the moments at which the teeth of the target pass past the primary cell.

The calibration method comprises steps of:
  determining a local minimum of the raw signal as a space separating two teeth of the target passes past the primary cell,
  determining a first local maximum of the raw signal in the vicinity of a falling front of said raw signal corresponding to the end of the passage of a tooth of the target past the primary cell,
  determining a first switching threshold for the generation of the output signal as a function of the values of the first local maximum and of the local minimum.

The calibration method is notable in that the value of said first local maximum is determined from a differential signal indicative of a difference in magnetic-field measurement by two secondary cells. Furthermore, the method comprises steps of:

determining, from said differential signal, a second local maximum of the raw signal in the vicinity of a rising front of said raw signal corresponding to the start of the passage of said tooth of the target past the primary cell, determining a second switching threshold as a function of the values of the second local maximum and of the local minimum, generating said output signal from the raw signal, from the first switching threshold and from the second switching threshold.

Thus, for each passage of a tooth of the target past the primary cell, two distinct switching thresholds are determined. Such measures notably make it possible to determine with greater precision the moments of a rising front and of a falling front of the output signal corresponding respectively to the moments marking the beginning and end of the passage of the mechanical fronts of said tooth as the tooth passes past the primary cell.

Advantageously, the two switching thresholds for one tooth may be determined as a function of the observations made in respect of said tooth in a previous revolution, so that they are adapted to suit the specific characteristics of said tooth (a potential geometric deficiency and the effects of target runout).

In particular modes of implementation, an aspect of the invention may furthermore include one or more of the following features, taken alone or in any technically feasible combination.

In particular implementations, the first local maximum corresponds to a value adopted by the raw signal when the differential signal adopts a first predetermined value, and the second local maximum corresponds to a value adopted by the raw signal when the differential signal adopts a second predetermined value, as said tooth of the target passes past the secondary cells.

In particular implementations:
the first local maximum corresponds to a value adopted by the raw signal in the vicinity of said falling front when the differential signal has a negative gradient and adopts a first predetermined value $D_{fe}$ defined by:

$$D_{fe}=D_m-(D_m-D_{min}) \times K_{fe}$$

the second local maximum corresponds to a value adopted by the raw signal in the vicinity of said rising front when the differential signal has a negative gradient and adopts a second predetermined value $D_{re}$ defined by:

$$D_{re}=D_m+(D_{max}-D_m) \times K_{re}$$

in which:
$D_{max}$ and $D_{min}$ correspond respectively to a maximum value and to a minimum value of the differential signal as the teeth of the target pass past the secondary cells,
$D_m$ is a value defined by:

$$D_m = \frac{D_{max} + D_{min}}{2}$$

$K_{re}$ and $K_{fe}$ are two factors comprised between 0 and 1.

In particular implementations, said local minimum corresponds to a value adopted by the raw signal when the differential signal adopts a predetermined value as a space separating two teeth of the target passes past the secondary cells.

In particular implementations, the local minimum corresponds to the value adopted by the raw signal when the differential signal adopts a value $D_m$ defined by:

$$D_m = \frac{D_{max} + D_{min}}{2}$$

where $D_{max}$ and $D_{min}$ are respectively a maximum value and a minimum value for the differential signal as the teeth of the target 14 pass past the secondary cells.

In particular implementations, the secondary cells are positioned one on either side of the primary cell, at equal distances from the primary cell, and at a distance from the center of the toothed target that is the same as that of the primary cell.

According to a second aspect, the invention relates to a camshaft sensor for a motor vehicle engine, comprising:
a toothed target,
a primary measurement cell configured to supply a raw signal indicative of the variations in a magnetic field which are induced by the rotation of the target, and
a processing module configured to supply, from said raw signal, an output signal indicative of the moments at which the teeth of the target pass past the primary cell.

Furthermore, the sensor comprises two secondary measurement cells and the processing module is configured to:
generate a differential signal indicative of a difference in magnetic field measurement by said two secondary cells,
determine, from said differential signal, a first local maximum of the raw signal in the vicinity of a falling front of said raw signal corresponding to the end of the passage of a tooth of the target past the primary cell,
determine, from said differential signal, a second local maximum of the raw signal in the vicinity of a rising front of said raw signal corresponding to the start of the passage of said tooth of the target past the primary cell,
determine a local minimum of the raw signal as a space separating two teeth of the target passes past the primary cell,
determine a first switching threshold as a function of the values of the first local maximum and of the local minimum,
determine a second switching threshold as a function of the values of the second local maximum and of the local minimum,
generate said output signal from the raw signal, from the first switching threshold and from the second switching threshold.

In some particular embodiments, the invention may furthermore comprise one or more of the following features, taken alone or in any technically feasible combination.

In particular embodiments, the first local maximum corresponds to a value adopted by the raw signal when the differential signal adopts a first predetermined value, and the second local maximum corresponds to a value adopted by the raw signal when the differential signal adopts a second predetermined value, as said tooth of the target passes past the secondary cells.

In particular embodiments:
the first local maximum corresponds to a value adopted by the raw signal in the vicinity of said falling front when the differential signal has a negative gradient and adopts a first predetermined value $D_{fe}$ defined by:

$$D_{fe}=D_m-(D_m-D_{min}) \times K_{fe}$$

the second local maximum corresponds to a value adopted by the raw signal in the vicinity of said rising front when the differential signal has a negative gradient and adopts a second predetermined value $D_{re}$ defined by:

$$D_{re}=D_m+(D_{max}-D_m) \times K_{re}$$

in which:

$D_{max}$ and $D_{min}$ correspond respectively to a maximum value and to a minimum value of the differential signal as the teeth of the target pass past the secondary cells, $D_m$ is a value defined by:

$$D_m = \frac{D_{max} + D_{min}}{2}$$

$K_{re}$ and $K_{fe}$ are two factors comprised between 0 and 1.

According to a third aspect, the present invention relates to a motor vehicle comprising a camshaft sensor according to any one of the above embodiments.

BRIEF DESCRIPTION OF THE DRAWINGS

Aspects of the invention will be better understood upon reading the following description, given by way of entirely non-limiting example and with reference to FIGS. 1 to 5, in which:

FIGS. 5A-5B: are schematic depictions of the output signal generated using two switching thresholds applied to the raw signal for one tooth of the target.

In these figures, references that are identical from one figure to the next denote identical or analogous elements. For the sake of clarity, the elements that are shown are not necessarily to the same scale, unless stated otherwise.

DETAILED DESCRIPTION OF THE PREFERRED EMBODIMENTS

As indicated previously, an aspect of the present invention seeks to improve the precision of a motor vehicle engine camshaft sensor.

Figure 1:
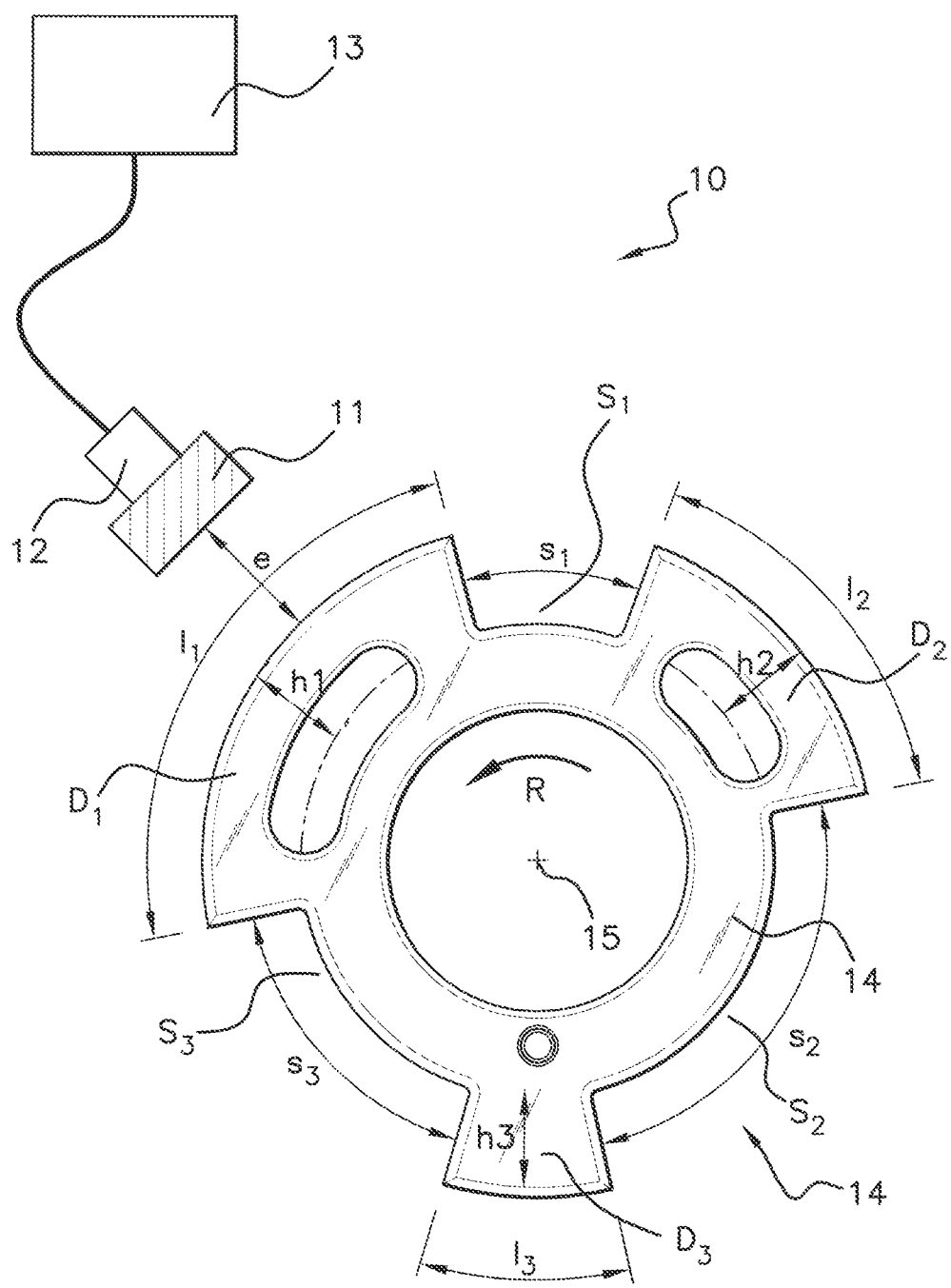
FIG. 1: is a schematic depiction of a conventional camshaft sensor.

FIG. 1 schematically depicts one example of a conventional camshaft sensor 10. This sensor 10 comprises a target 14, a magnetic-field generator 11, a primary measurement cell 12, and an electronic signal-processing module 13.

In one example considered and described entirely non-limitingly, the target 14 consists of a metal disk the periphery of which is toothed, the magnetic-field generator 11 is a permanent magnet, and the primary cell 12 for measuring the magnetic field is a Hall-effect cell. As illustrated in FIG. 1, the primary measurement cell 12 is positioned at the level of the magnetic-field generator 11.

It should be noted that, according to another example, the magnetic field measured by the measurement cell may be formed by the target itself, which, as appropriate, is made of a magnetic material. In such an instance, the target is "magnetically" toothed, which means to say that the geometry of the periphery of the target exhibits an alternation of North poles (equivalent to the teeth in the example of FIG. 1) and south poles (equivalent to the spaces in the example of FIG. 1).

The target 14 is fixed to a camshaft spindle in such a way that the disk of the target 14 and the camshaft spindle are coaxial. In other words, in an ideal situation, namely in the absence of any lack of precision in the mounting of the target 14 on the camshaft, the axis of the camshaft spindle and the axis of the target 14 coincide, and both pass through the center 15 of the target 14.

The teeth D1, D2, D3 of the target 14 have respective lengths l1, l2 and l3, and are separated from one another by spaces S1, S2, S3 of respective lengths s1, s2 and s3. In order to code for the angular position of the target, the lengths l1, l2, l3, s1, s2, s3 of the teeth D1, D2, D3 and of the spaces S1, S2, S3 are not all identical. The teeth D1, D2, D3 generally all have the same height, but deficiencies in the manufacturing of the target 14 may nevertheless cause slightly different values to be observed for the respective heights h1, h2, h3 of the teeth D1, D2, D3.

It should be noted that, in the example considered, the target 14 comprises three teeth D1, D2, D3, but an aspect of the invention also applies to sensors 10 of which the target 14 comprises a different number of teeth. In particular, an aspect of the invention is applicable to a target 14 comprising at least one tooth.

The rotation R of the target 14 and the successive passage of the various teeth D1, D2, D3 past the magnetic-field generator 11 lead to variations in the magnetic field measured by the primary cell 12. In effect, the magnetic field varies as a function of the magnitude of the gape separating the magnetic-field generator 11 and the target 14.

The primary measurement cell 12 supplies the processing module 13 with a raw signal indicative of the intensity of the magnetic field measured. The processing module 13 is, for example, configured to generate, from this raw signal, an output signal indicative of the moments at which the various teeth D1, D2, D3 of the target 14 pass past the primary measurement cell 12. The output signal may then make it possible to recognise the moments at which the various teeth D1, D2, D3 of the target 14 pass past the primary measurement cell 12 and, ultimately, the angular position of the camshaft secured to the target.

In order to do that, the processing module 13 comprises for example one or more processors and storage means (electronic memory) in which a computer program product is stored, in the form of a set of program code instructions to be executed in order to implement the various steps needed for generating said output signal from the raw signal. Alternatively or in addition, the processing module 13 comprises programmable logic circuits of FPGA, PLD, etc. type, and/or one or more specialized integrated circuits (ASIC), and/or discrete electronic components, etc., suitable for implementing these steps. In other words, the processing module 13 comprises means configured by software and/or by hardware to implement the operations necessary for generating said output signal from the raw signal.

Figure 2:
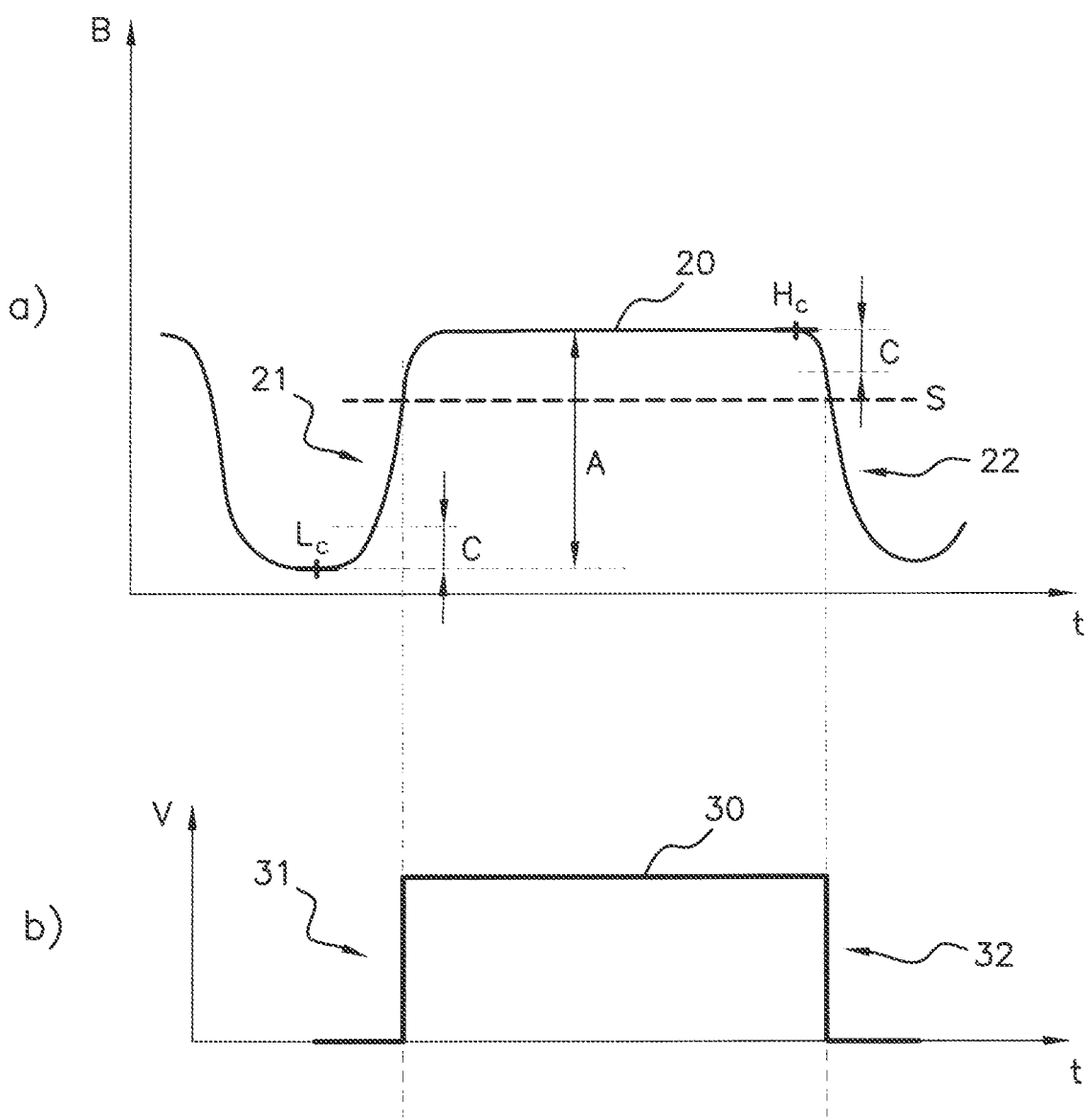
FIGS. 2A-2B: are schematic depictions, for one tooth of the target, of a raw signal indicative of the variations in the magnetic field which are induced by the rotation of the target of the sensor, and of an associated output signal.

FIG. 2A schematically depicts a portion of a raw signal 20, indicative of the variations in the magnetic field measured by the primary cell 12. The intensity B of the magnetic field is represented on the ordinate axis while the time t is represented on the abscissa axis.

The portion of the raw signal 20 depicted in FIG. 2A corresponds for example to a passage of the tooth D1 of the target 14 past the primary measurement cell 12. The raw signal 20 thus exhibits a main square form with a rising front 21 corresponding to the start of the passage of the tooth D1 past the primary cell 12, and a falling front 22 corresponding to the end of the passage of the tooth D1 past the primary cell 12. The rising front corresponds to a sharp increase in the magnetic field caused by the sharp decrease in the magnitude of the gap e as the tooth D1 begins to pass past the primary cell 12 (the transition from a space S3 to a tooth D1). The falling front corresponds to a sharp decrease in the magnetic field caused by the sharp increase in the magnitude of the gap e as the tooth D1 completes its passage past the primary cell 12 (the transition from a tooth D1 to a space S1). Between the rising front 21 and the falling front 22, the signal 20 adopts a value that is more or less constant assuming that the magnitude of the gap remains substantially identical throughout the time taken for the tooth D1 to pass past the primary cell 12. Such an assumption assumes a height h1 that is more or less constant over the entire length l1 of the tooth D1, and the imbalance of any runout presented by the target 14.

FIG. 2B schematically depicts a portion of an output signal 30 generated by the processing module 13 from the raw signal 20.

This output signal 30 is for example an electrical signal adopting a positive value (for example 5V) when a tooth D1, D2, D3 is facing the primary cell 12, and a zero value (0V) when a space S1, S2, S3 is facing the primary cell 12. The electrical voltage V of the output signal 30 is represented on the ordinate axis and the time t is represented on the abscissa axis.

The output signal 30 thus comprises a succession of square waveforms, each square form corresponding to the passage of a tooth D1, D2, D3 of the target 14 past the primary measurement cell 12. Each square form comprises a rising front 31 and a falling front 32 corresponding more or less to the passing of the mechanical fronts of a tooth D1, D2, D3 past the measurement cell. The portion of the raw signal 30 depicted in FIG. 2B corresponds for example to a passage of the tooth D1 past the primary cell 12.

In general, each rising front 31 and falling front 32 of the output signal 30 (namely each transition of the electrical signal) is determined from a switching threshold S that is predefined for the raw signal 20. In other words, the output signal 30 exhibits a rising front 31 when the raw signal 20 passes above the switching threshold S, and the output signal 30 exhibits a falling front 32 when the raw signal 20 passes below the switching threshold S.

Conventionally, the switching threshold S is calculated for example on the basis of a percentage of an amplitude A of the raw signal 20 equal to the difference between a local maximum $H_c$ and a local minimum $L_c$ which are observed for said raw signal 20. The switching threshold S conventionally corresponds to a value chosen in a range comprised between 70% and 80% of the amplitude A, preferably around 75% of the amplitude A. In other words, for a factor K comprised between 0 and 1, generally comprised between 0.7 and 0.8 and preferably equalling 0.75, the switching threshold S is conventionally defined by:

$$S = L_c + A \times K$$

It is known practice, for example, to determine, for each new revolution of the target 14, for the tooth D1, a local minimum $L_c$ of the raw signal 20 preceding a rising front 21, and a local maximum $H_c$ preceding a falling front 22, so as to update the value of a switching threshold S to be used to generate the output signal 30 during the next revolution of the target 14.

It is also known practice, for example, to detect a local minimum $L_c$ (or, respectively, a local maximum $H_c$) when the raw signal 20 varies by a value that is greater (in terms of absolute value) than a predefined constant C after its gradient has become positive (or, respectively, negative).

This can be repeated for each revolution of the target 14 and for each tooth D1, D2, D3 of the target 14 so as to obtain, for the next revolution of the target 14, a value for the switching threshold S to be used. This may be the one same switching threshold S to be used for all the teeth D1, D2, D3 (the value of this threshold being calculated for example as a function of a mean, minimum or maximum value of the local minima $L_c$ and/or of the local maxima $H_c$ observed for the teeth D1, D2, D3), or else it may be a switching threshold S that is different for each tooth D1, D2, D3 (the value of this threshold being calculated for example as a function of the local maximum $H_c$ and of the local minimum $L_c$ which are observed for each tooth D1, D2, D3).

However, such a solution does not provide sufficient precision in the event of the target 14 exhibiting runout. What is meant by the "target exhibiting runout" is a deficiency associated with the fact that the axis of the target 14 does not coincide perfectly with the axis of the camshaft spindle to which the target 14 is attached. Such a deficiency may lead to greater or lesser variations in the raw signal 20 over a portion separating a rising front 21 from a falling front 22.

Figure 3:
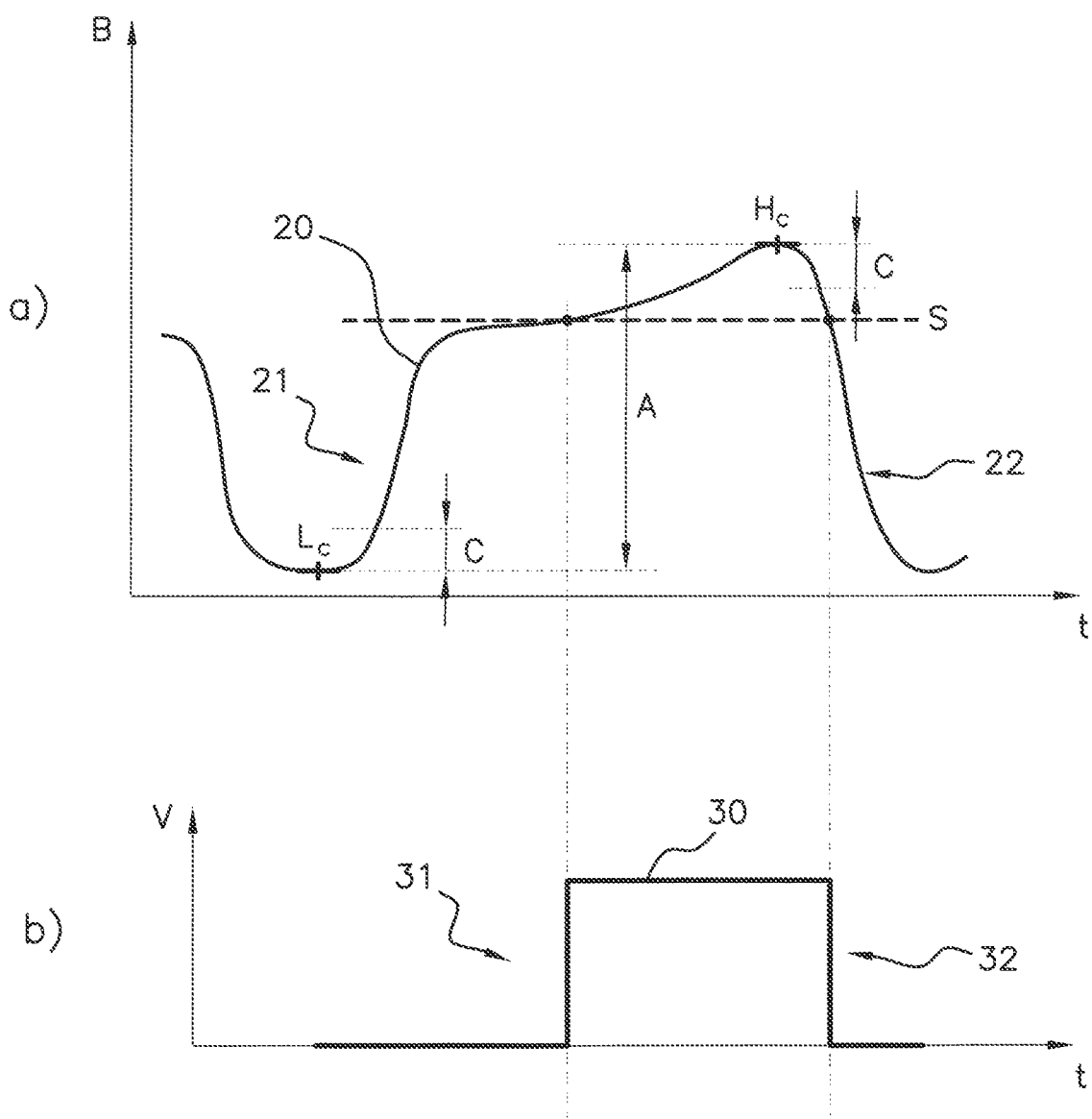
FIGS. 3A-3B: are schematic depictions of the effect of target runout on the raw signal and on the output signal for one tooth of the target.

FIG. 3A schematically depicts the effect that significant runout has on the portion of the raw signal 20 corresponding to the passage of the tooth D1 past the primary cell 12. Because of the runout, the magnitude of the gap e between the tooth D1 and the magnetic-field generator 11 can vary significantly as the tooth D1 passes past the primary measurement cell 12. The greater the length l1 of the tooth D1, the greater this variation may be.

As illustrated in FIG. 3A, the local maximum $H_c$ of the raw signal 20 detected in the vicinity of the falling front 22 is significantly greater than a local maximum of the raw signal 20 in the vicinity of the rising front 21. The result of this is that the switching threshold S calculated as a function of the difference between the local maximum $H_c$ and the local minimum $L_c$ is appropriate for determining the falling front 32 of the output signal 30, but by contrast not at all appropriate for determining the rising front 31 thereof.

FIG. 3B depicts the portion of the output signal 30 generated from the switching threshold S thus calculated. It is clearly apparent that the rising front 31 of the output signal 30 is triggered belatedly in comparison with the start of the passage of the tooth D1 past the primary cell 12. That then leads to imprecision of the sensor 10 in determining the moment at which the tooth D1 passes past the primary measurement cell 12 and, ultimately, to imprecision in the estimate of the angular position of the camshaft attached to the target 14.

It should be noted that the problem of target runout leading to variations in the raw signal 20 over a portion separating a rising front 21 from a falling front 22 may also be generated or amplified by the fact of a height h1, h2, h3 of a tooth D1, D2, D3 not being constant over the length l1, l2, l3 of said tooth D1, D2, D3. Such a phenomenon may be brought about by deficiencies in the manufacturing of the target 14.

As illustrated in FIG. 3A, target runout leads to a modulation of the raw signal 20, leading to asymmetry in the portion of the raw signal 20 that corresponds to the passage of a tooth D1, D2, D3 past the primary cell 12. This modulation is generally periodic and follows the frequency of rotation of the target 14. In other words, the asymmetry illustrated in FIG. 3A in respect of the tooth D1, repeats for each revolution of the target 14.

The remainder of the description concerns itself with describing a camshaft sensor and a method for calibrating said sensor to make it possible to correct the aforementioned problem of target runout.

Figure 4:
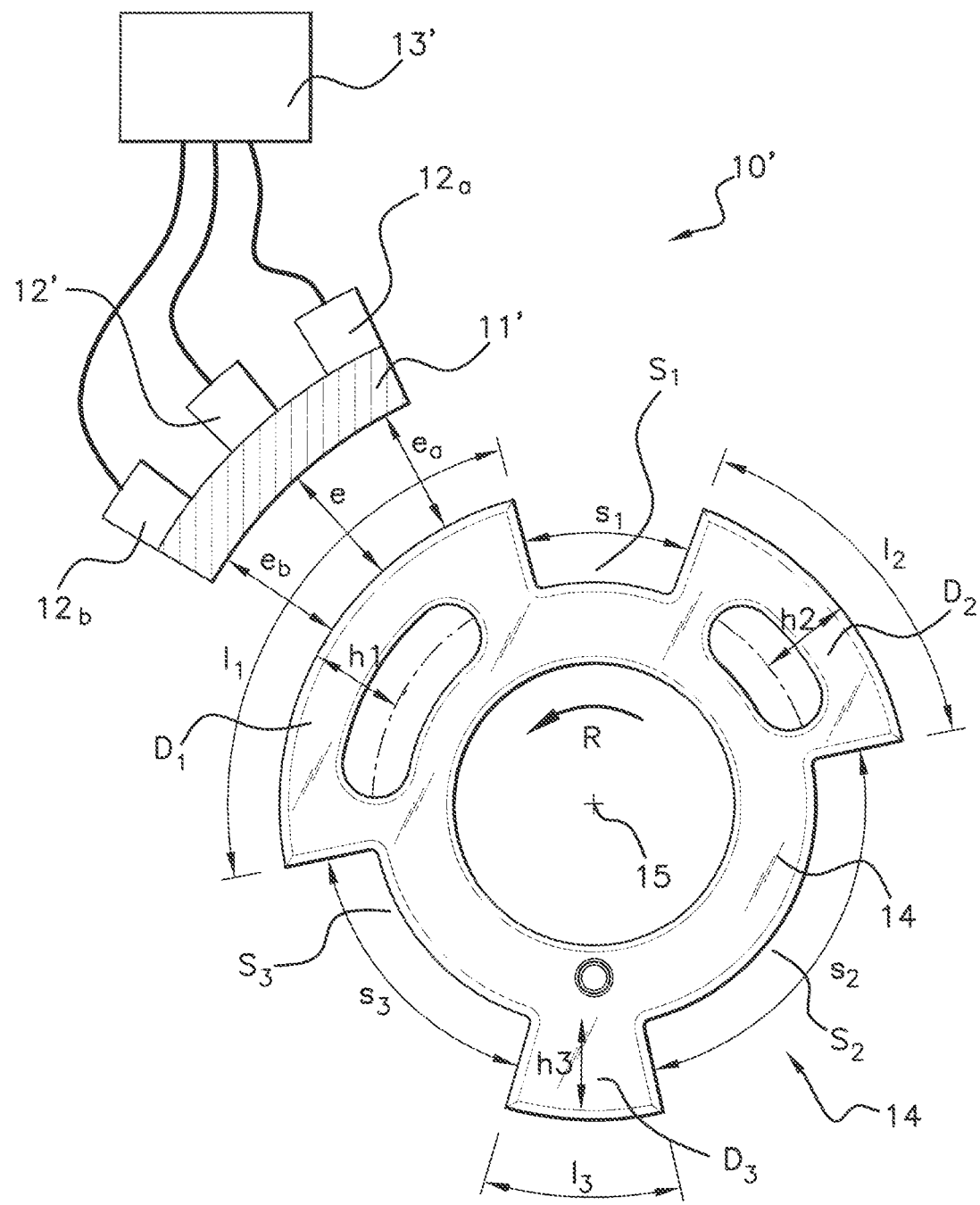
FIG. 4: is a schematic depiction of a camshaft sensor according to an aspect of the invention.

FIG. 4 schematically depicts such a camshaft sensor 10'. In addition to the elements already described with reference to FIG. 1, the sensor 10' depicted in FIG. 4 also comprises two secondary magnetic-field measurement cells 12a, 12b.

In the example considered and as illustrated schematically in FIG. 4, the two secondary cells 12a, 12b are arranged one on either side of a primary cell 12', at equal distances from the primary cell 12' and at a distance from the center 15 of the toothed target 14 that is equal to the distance separating the primary cell 12' from the center 15 of the target 14.

The processing module 13' is configured to generate, from the magnetic-field measurements taken by the secondary cells 12a, 12b, a differential signal indicative of a difference in the magnetic field measured by said secondary cells 12a, 12b.

FIG. 5A schematically depicts a portion of a raw signal 20 indicative of the variations in the magnetic field measured by the primary cell 12' upon the passage of the tooth D1. This portion of the raw signal 20 is similar to that previously described with reference to FIG. 3A.

Furthermore, the corresponding portion of the differential signal 40 indicative of the difference in magnetic field measured by the secondary cells 12a, 12b is also depicted in FIG. 5A.

In the portion illustrated in FIG. 5A, the differential signal 40 reaches a local minimum 41 when the secondary cell 12a is already facing the space S3 separating the tooth D3 from the tooth D1 whereas the secondary cell 12b is still facing the tooth D3 (at this moment, the secondary cell 12a actually measures a weak magnetic field because the magnitude of the gap ea separating the magnetic-field generator 11' and the target 14 at the level of the secondary cell 12a is large, whereas conversely at the same moment the secondary cell 12b measures a strong magnetic field because the magnitude of the gap $e_b$ separating the magnetic-field generator 11' and the target 14 at the level of the secondary cell 12b is small). The differential signal 40 reaches a local maximum 42 when the secondary cell 12a is already facing the tooth D1 (magnitude of gap ea small) whereas the secondary cell 12b is still facing the space S3 separating the tooth D3 from the tooth D1 (magnitude of gap $e_b$ large). The differential signal 40 then reaches a new local minimum 43 when the secondary cell 12a is already facing the space S1 separating the tooth D1 from the tooth D2 whereas the secondary cell 12b is still facing the tooth D1.

The differential signal 40 thus exhibits a succession of local minima and maxima as the various teeth D1, D2, D3 of the target 14 pass past the secondary cells 12a, 12b during a revolution of the target 14.

It is therefore possible, from this differential signal 40, to determine, for a given tooth D1, D2, D3 of the target 14, two distinct switching thresholds rather than one single switching threshold.

For example, and as illustrated in FIG. 5A, as the tooth D1 passes past the various primary 12' and secondary 12a, 12b measurement cells, it is possible to determine, from the differential signal 40, a first switching threshold $S_{fe}$ for the falling front 22 of the raw signal 20 corresponding to the end of the passage of the tooth D1 past the primary cell 12', and a second switching threshold $S_{re}$ for the rising front 21 of the raw signal 20, corresponding to the start of the passage of the tooth D1 past the primary cell 12'.

Determining a first switching threshold $S_{fe}$ for the falling front 22 and a distinct second switching threshold $S_{re}$ for the rising front 21 makes it possible to correct the problem generated by the target runout.

In one particular implementation, the processing module 13' is configured for example to determine, for the tooth D1 during one revolution of the target 14:

a value $D_{max}$ corresponding to a mean value for the local maxima 42 observed for the differential signal 40 for the various teeth D1, D2, D3, a value $D_{min}$ corresponding to a mean value for the local minima 41, 43 observed for the differential signal 40 for the various teeth D1, D3, D3, a value $D_m$ defined by:

$$D_m = \frac{D_{max} + D_{min}}{2}$$

a first predetermined value $D_{fe}$ defined by:

$$D_{fe} = D_m - (D_m - D_{min}) \times K_{fe}$$

where $K_{fe}$ is a predetermined factor comprised between 0 and 1, and preferably comprised between 0.125 and 0.25, a second predetermined value $D_{re}$ defined by:

$$D_{re} = D_m + (D_{max} - D_m) \times K_{re}$$

where $K_{re}$ is a predetermined factor comprised between 0 and 1, and preferably comprised between 0.125 and 0.25, a local minimum L for the raw signal 20 upon the passage of a space S3 a value of a first local maximum $H_{fe}$, as being the value adopted by the raw signal 20 in the vicinity of the falling front 22 when the differential signal 40 has a negative gradient and adopts the first predetermined value $D_{fe}$, a value of a second local maximum $H_{re}$, as being the value adopted by the raw signal 20 in the vicinity of the rising front 21 when the differential signal 40 has a negative gradient and adopts the second predetermined value $D_{re}$, a first amplitude $A_{fe}$ corresponding to the difference between the values of the first local maximum $H_{fe}$ and of the local minimum L, a second amplitude $A_{re}$ corresponding to the difference between the values of the second local maximum $H_{re}$ and of the local minimum L, the first switching threshold $S_{fe}$ defined by:

$$S_{fe} = L + A_{fe} \times K$$

the second switching threshold $S_{re}$ defined by:

$$S = L + A_{re} \times K$$

where K is a predefined factor comprised between 0 and 1, preferably between 0.7 and 0.8, and more preferably still, approximately equal to 0.75.

FIG. 5A schematically depicts the values of the first local maximum $H_{fe}$, of the second local maximum $H_{re}$, of the first amplitude $A_{fe}$, of the second amplitude $A_{re}$, of the first switching threshold $S_{fe}$, and of the second switching threshold $S_{re}$ which are determined for a passage of the tooth D1 past the primary cell 12'. These operations can obviously be repeated for the other teeth D1, D2, D3 of the target 14 so as to determine two different switching thresholds for each of them.

FIG. 5B illustrates how the first switching threshold $S_{fe}$ and the second switching threshold $S_{re}$ are used, in the next revolution of the target 14, to generate the output signal 30. As the tooth D1 passes past the primary cell 12', the output signal 30 exhibits a rising front 31 (which means to say that the electrical signal switches from a low state at 0V to a high state at 5V) at the moment at which the raw signal 20 measured by the primary cell 12' passes above the second switching threshold $S_{re}$. The output signal 30 exhibits a falling front 32 (transition from the high state to the low state) at the moment at which the raw signal 20 measured by the primary cell 12' passes below the first switching threshold $S_{fe}$.

It can be seen from FIG. 5B that the output signal 30 indicates with precision the instant at which the tooth D1 passes past the primary cell 12', and does so in spite of the asymmetry of the corresponding portion of the raw signal 20 due to the target runout.

Once again, it should be noted that these operations can be repeated for the various teeth D1, D2, D3 of the targets 14 using the switching thresholds determined for each of them.

It is appropriate to note that other methods can be employed for determining the values $D_{min}$ and $D_{max}$. For example, in order to determine $D_{min}$, rather than using a mean value of the local minima 41, 43 observed for the differential signal 40 for the various teeth D1, D2, D3 during one revolution of the target 14, it is conceivable to use a maximum value or a minimum value of said local minima 41, 43. The same goes for the determination of $D_{max}$, which can be determined as being the maximum value or the minimum value of the local maxima 42 observed for the differential signal 40 for the various teeth D1, D2, D3 during a revolution of the target 14. Also, a particular choice of method for determining $D_{min}$, $D_{max}$, $D_m$, the first predetermined value $D_{fe}$ or the second predetermined value $D_{re}$ merely represents a variant of an aspect of the invention.

The values $D_{min}$, $D_{max}$, $D_m$, $K_{re}$, $K_{fe}$, the first predetermined value $D_{fe}$ or the second predetermined value $D_{re}$ may potentially be determined according to the positioning of the secondary cells 12a, 12b with respect to the primary cell 12', notably if the secondary cells 12a, 12b are not situated at the same distance from the primary cell 12'.

In the example considered, the values $D_{min}$, $D_{max}$, $D_m$, the first predetermined value $D_{fe}$ or the second predetermined value $D_{re}$ are updated for each new revolution of the target 14. However, there is nothing to prevent the values, in other examples, from being predetermined and from not varying during operation of the sensor 10', or else from being updated less frequently, for example when the target 14 has reached a certain number of revolutions, or else when a predetermined period of time has elapsed. It is advantageous for these values to be updated regularly, because they can vary, as a function of the temperature for example, during the course of operation of the sensor.

The same goes for the values of the first local maximum $H_{fe}$, of the second local maximum $H_{re}$, of the local minimum L, of the first amplitude $A_{fe}$, of the second amplitude $A_{re}$, of the first switching threshold $S_{fe}$, and of the second switching threshold $S_{re}$: these can be determined for each tooth D1, D2, D3 and updated for each new revolution of the target 14, or else they can be updated less frequently.

The local minimum L may for example be detected, in a known way, similarly to that which has been described with reference to FIG. 3A, when the raw signal 20 varies by a value that is greater (in terms of absolute value) than a predefined constant C after its gradient has become positive in the vicinity of the rising front 21. It is thus possible to define such a local minimum L for each tooth D1, D2, D3 for each new revolution of the target 14.

According to other examples, it is also conceivable to use the mean (or maximum or minimum) value of the collection of local minima L observed for the raw signal 20 for the various teeth D1, D2, D3 during a revolution of the target 14. Here again, this value can be updated for each revolution of the target 14, or else less frequently.

In particular implementations, a local minimum L can be detected using the differential signal 40. For example, and as illustrated in FIG. 5A, the value of the local minimum L of the raw signal 20 during the passage of the space S3 separating the tooth D3 and the tooth D1 corresponds to the value adopted by the raw signal 20 at the moment at which the differential signal reaches the value $D_m$.

Thus, in the example illustrated in FIG. 5A:
the local minimum L of the raw signal 20 is determined as being the value of the raw signal 20 at the moment at which the differential signal 40 adopts the value $D_m$ as it passes from a local minimum 41 to a local maximum 42,
the first local maximum $H_{fe}$ is determined as being the value of the raw signal 20 at the moment at which the differential signal 40 adopts the first predetermined value $D_{fe}$ as it passes from a local maximum 42 to a local minimum 43,
the second local maximum $H_{re}$ is determined as being the value of the raw signal 20 at the moment at which the differential signal 40 adopts the second predetermined value $D_{re}$ as it passes from a local maximum 42 to a local minimum 43.

It is appropriate to note that runout presented by the target 14 has less of an impact on those portions of the raw signal 20 that correspond to the passage of a space S1, S2, S3 past the primary cell 12' than it does on those portions of the raw signal 20 that correspond to the passage of a tooth past the primary cell 12'. In other words, the asymmetry caused by the target runout and observed on a portion of the raw signal 20 corresponding to the passage of a tooth past the primary cell 12' is not generally observed on a portion of the raw signal 20 corresponding to the passage of a space S1, S2, S3 past the primary cell 12'. According to the teaching of an aspect of the invention, it is still nevertheless conceivable to define, from the differential signal 40, two distinct local minima $L_{re}$ and $L_{fe}$ corresponding, respectively, to a local minimum of the raw signal 20 in the vicinity of the rising front 21 and to a local minimum of the raw signal 20 in the vicinity of the falling front 22. The first switching threshold $S_{fe}$ and the second switching threshold $S_{re}$ can then for example be determined thus:

$$S_{re} = L_{re} + (H_{re} - L_{re}) \times K$$

$$S_{fe} = L_{fe} + (H_{fe} - L_{fe}) \times K$$

The description above clearly illustrates that, through its various features and the advantages thereof, the an aspect of present invention achieves the set aims. In particular, the calibration method according to an aspect of the invention makes it possible to determine with greater precision in the moments of a rising front 31 and of a falling front 32 of the output signal 30 corresponding respectively to the moments marking the beginning and end of the passage of the mechanical fronts of a tooth D1, D2, D3 as said tooth D1, D2, D3 passes past the primary cell 12'. The first switching threshold $S_{fe}$ and the second switching threshold $S_{re}$ for one tooth D1, D2, D3 are advantageously determined as a function of the observations made in respect of said tooth in a previous revolution, so that they are adapted to suit the specific characteristics of said tooth (potential deficiencies of geometry and the effects of target runout).

The invention claimed is:

1. A method for automatic calibration of a camshaft sensor for a motor vehicle engine, said sensor comprising:
  a toothed target,
  a primary measurement cell configured to supply a first raw signal indicative of variations in a first magnetic field which are induced by a rotation of the target,
  two secondary measurement cells configured to supply a respective second raw signal and a third raw signal each indicative of variations in a respective second magnetic field and at third magnetic field which are induced by the rotation of the target, and
  a processing module configured to supply, from the first raw signal, the second raw signal, and the third raw signal, an output signal indicative of moments at which teeth of the target pass past the primary cell,
said calibration method comprising:
  determining a local minimum of the first raw signal as a space separating two teeth of the target passes past the primary cell,
  determining a differential signal as a difference between the second raw signal and the third raw signal,
  determining, from said differential signal, a first local maximum of the first raw signal in a vicinity of a falling front of said first raw signal corresponding to an end of the passage of a tooth of the target past the primary cell,
  determining a first switching threshold for generation of the output signal as a function of values of the first local maximum and of the local minimum,
  determining, from said differential signal, a second local maximum of the first raw signal in a vicinity of a rising front of said first raw signal corresponding to a start of the passage of said tooth of the target past the primary cell,
  determining a second switching threshold as a function of the values of the second local maximum and of the local minimum, and
  generating said output signal from the first raw signal, from the first switching threshold and from the second switching threshold.

2. The method as claimed in claim 1, wherein the first local maximum corresponds to a value adopted by the first raw signal when the differential signal adopts a first predetermined value, and the second local maximum corresponds to a value adopted by the first raw signal when the differential signal adopts a second predetermined value, as said tooth of the target passes past the secondary cells.

3. The method as claimed in claim 2, wherein:
  the first local maximum corresponds to a value adopted by the first raw signal in the vicinity of said falling front when the differential signal has a negative gradient and adopts a first predetermined value defined by:

$$D_{fe} = D_m - (D_m - D_{min}) \times K_{fe}$$

the second local maximum corresponds to a value adopted by the first raw signal in the vicinity of said rising front when the differential signal has a negative gradient and adopts a second predetermined value defined by:

$$D_{re} = D_m + (D_{max} - D_m) \times K_{re}$$

in which:
  $D_{max}$ and $D_{min}$ correspond respectively to a maximum value and to a minimum value of the differential signal as the teeth of the target pass past the secondary cells,
  $D_m$ is a value defined by:

$$D_m = \frac{D_{max} + D_{min}}{2}$$

$K_{re}$ and $K_{fe}$ are two factors comprised between 0 and 1.

4. The method as claimed in claim 1, wherein the local minimum corresponds to a value adopted by the first raw signal when the differential signal adopts a predetermined value as a space separating two teeth of the target passes past the secondary cells.

5. The method as claimed in claim 4, wherein the local minimum corresponds to the value adopted by the first raw signal when the differential signal adopts a predetermined value defined by:

$$D_m = \frac{D_{max} + D_{min}}{2}$$

where $D_{max}$ and $D_{min}$ correspond respectively to a maximum value and to a minimum value of the differential signal as the teeth of the target pass past the secondary cells.

6. The method as claimed in claim 1, wherein said secondary cells are arranged one on either side of the primary cell, at equal distances from the primary cell and at a distance from the center of the target that is equal to the distance separating the primary cell from the center of the target.

7. A camshaft sensor for a motor vehicle engine, comprising:
  a toothed target,
  a primary measurement cell configured to supply a first raw signal indicative of variations in a first magnetic field which are induced by rotation of the target,
  two secondary measurement cells configured to supply a respective second raw signal and a third raw signal each indicative of variations in a respective second magnetic field and at third magnetic field which are induced by the rotation of the target, and
  a processing module configured to supply, from said first raw signal, the second raw signal, and the third raw signal, an output signal indicative of moments at which teeth of the target pass past the primary cell,
wherein:
said sensor further comprises two secondary measurement cells,
the processing module is furthermore configured to:
  generate a differential signal indicative of a difference in magnetic field measurement by said two secondary cells,
  determine the differential signal as a difference between the second raw signal and the third raw signal,
  determine, from said differential signal, a first local maximum of the first raw signal in a vicinity of a falling front of said first raw signal corresponding to an end of the passage of a tooth of the target past the primary cell,
  determine, from said differential signal, a second local maximum of the first raw signal in the vicinity of a rising front of said first raw signal corresponding to a start of the passage of said tooth of the target past the primary cell, determine a local minimum of the first raw signal as a space separating two teeth of the target passes past the primary cell, determine a first switching threshold as a function of the values of a first local maximum and of a local minimum, determine a second switching threshold as a function of the values of the first local maximum and of the local minimum, and generate said output signal from the first raw signal, from the first switching threshold and from the second switching threshold.

8. The sensor as claimed in claim 7, wherein the first local maximum corresponds to a value adopted by the first raw signal when the differential signal adopts a first predetermined value, and the second local maximum corresponds to a value adopted by the first raw signal when the differential signal adopts a second predetermined value, as said tooth of the target passes past the secondary cells.

9. The sensor as claimed in claim 8, wherein:

the first local maximum corresponds to a value adopted by the first raw signal in the vicinity of said falling front when the differential signal has a negative gradient and adopts a first predetermined value defined by:

$$D_{fe}=D_m-(D_m-D_{min})\times K_{fe}$$

the second local maximum corresponds to a value adopted by the first raw signal in the vicinity of said rising front when the differential signal has a negative gradient and adopts a second predetermined value defined by:

$$D_{re}=D_m+(D_{max}-D_m)\times K_{re}$$

in which:

$D_{max}$ and $D_{min}$ correspond respectively to a maximum value and to a minimum value of the differential signal as the teeth of the target pass past the secondary cells, $D_m$ is a value defined by:

$$D_m = \frac{D_{max} + D_{min}}{2}$$

$K_{re}$ and $K_{fe}$ are two factors comprised between 0 and 1.

10. A motor vehicle comprising a camshaft sensor as claimed in claim 7.

* * * * *